United States Patent
Jung

(10) Patent No.: US 8,675,054 B2
(45) Date of Patent: Mar. 18, 2014

(54) STEREOSCOPIC IMAGE DISPLAY AND METHOD FOR DRIVING THE SAME

(75) Inventor: Sungmin Jung, Incheon (KR)

(73) Assignee: LG Display Co., Ltd., Seoul (KR)

(*) Notice: Subject to any disclaimer, the term of this patent is extended or adjusted under 35 U.S.C. 154(b) by 512 days.

(21) Appl. No.: 13/081,034

(22) Filed: Apr. 6, 2011

(65) Prior Publication Data

US 2011/0279659 A1 Nov. 17, 2011

(30) Foreign Application Priority Data

May 14, 2010 (KR) .................. 10-2010-0045249

(51) Int. Cl.
*H04N 9/47* (2006.01)
*H04N 13/04* (2006.01)

(52) U.S. Cl.
USPC ............... 348/54; 348/42; 348/43; 348/51; 348/53; 348/55; 348/56; 348/57; 348/58

(58) Field of Classification Search
USPC .................. 348/42, 43, 51, 53, 55–58
See application file for complete search history.

(56) References Cited

U.S. PATENT DOCUMENTS

| 8,026,887 | B2 * | 9/2011 | Koo et al. | 345/96 |
| 8,179,351 | B2 * | 5/2012 | Song et al. | 345/96 |
| 8,294,738 | B2 * | 10/2012 | Ahn | 345/690 |
| 8,531,388 | B2 * | 9/2013 | Lee et al. | 345/103 |
| 8,547,309 | B2 * | 10/2013 | Byun | 345/77 |

* cited by examiner

*Primary Examiner* — Geepy Pe
(74) *Attorney, Agent, or Firm* — Morgan, Lewis & Bockius LLP

(57) ABSTRACT

A stereoscopic image display and a method for driving the same are disclosed. The stereoscopic image display includes a display panel, that displays data of a 2D image in a 2D mode and display data of a 3D image in a 3D mode in a time division manner, and a data modulation unit that previously stores modified values satisfying a luminance of a predetermined gray level and modulates left eye image data or right eye image data input during a current frame period to a modified value selected based on the result of a comparison between right/left eye image data input during a previous frame period and the left/right eye image data of the current frame period using the previously stored modified values.

10 Claims, 16 Drawing Sheets

STEREOSCOPIC IMAGE DISPLAY AND METHOD FOR DRIVING THE SAME

This application claims the benefit of Korea Patent Application No. 10-2010-0045249 filed on May 14, 2010, the entire contents of which is incorporated herein by reference for all purposes as if fully set forth herein.

BACKGROUND OF THE INVENTION

1. Field of the Invention

Embodiments of the invention relate to a stereoscopic image display and a method for driving the same.

2. Discussion of the Related Art

A stereoscopic image display is classified into a display using a stereoscopic technique and a display using an autostereoscopic technique.

The stereoscopic technique, which uses a parallax image between left and right eyes of a user with a high stereoscopic effect, includes a glasses type method and a non-glasses type method, both of which have been put on the market. In the glasses type method, the parallax image between the left and right eyes is displayed on a direct-view display or a projector through a change in a polarization direction of the left and right parallax image or in a time-division manner, and thus a stereoscopic image is implemented using polarization glasses or shutter glasses. In the non-glasses type method, an optical axis of the parallax image between the left and right eyes is separated generally using an optical plate such as a parallax barrier and a lenticular lens, and thus the stereoscopic image is implemented.

A glasses type stereoscopic image display generally displays a left eye image and a right eye image on a display panel in a time division manner. Glasses the user wears include a left eye filter (or a left eye shutter) for transmitting light of the left eye image and a right eye filter (or a right eye shutter) for transmitting light of the right eye image. Thus, the user may view only the left eye image during odd-numbered frame periods and may view only the right eye image during even-numbered frame periods, thereby feeling a stereoscopic feeling through the stereoscopic technique.

The user, that views a stereoscopic image through the glasses type stereoscopic image display, may perceive a 3D crosstalk, in which the user views doubled image by leaking part of the left eye image into the right eye image and vice versa. There is a ghosting phenomenon as an example of the 3D crosstalk. In the ghosting phenomenon, because a gray level of a current left eye image or a current right eye image is affected by a gray level of a previous left eye image or a previous right eye image that has been previously displayed on the display panel, the current left/right eye image is reproduced at a gray level different from an original gray level of the current left/right eye image.

SUMMARY OF THE INVENTION

Embodiments of the invention provide a stereoscopic image display and a method for driving the same capable of reducing a 3D crosstalk.

In one aspect, there is a stereoscopic image display comprising a display panel including data lines and gate lines crossing each other, the display panel configured to display data of a two-dimensional (2D) image in a 2D mode and display data of a three-dimensional (3D) image in a 3D mode in a time division manner, a data modulation unit configured to previously store modified values satisfying a luminance $L_i^*$ of a gray level "i" defined by the following Equation and modulate left eye image data or right eye image data input during a current frame period to a modified value selected based on the result of a comparison between right/left eye image data input during a previous frame period and the left/right eye image data of the current frame period using the previously stored modified values, a data driving circuit configured to convert the left/right eye image data of the current frame period modulated by the data modulation unit into an analog gamma compensation voltage, generate a data voltage using the analog gamma compensation voltage, and supply the data voltage to the data lines, and a gate driving circuit configured to supply a gate pulse synchronized with the data voltage to the gate lines, $$L_i^* = X + \left(\frac{i}{255}\right)^\gamma \cdot (Y - X)$$

where X is one of a luminance change value L0,255 obtained when the gray level "i" of the left/right eye image data of the current frame period is a minimum gray level "0 (zero)" and a gray level "j" of the right/left eye image data of the previous frame period is a maximum gray level "255", and a luminance change value L0,0 obtained when both the gray level "i" of the left/right eye image data of the current frame period and the gray level "j" of the right/left eye image data of the previous frame period are the minimum gray level "0 (zero)", Y is one of a luminance change value L255,0 obtained when the gray level "i" of the left/right eye image data of the current frame period is the maximum gray level "255" and the gray level "j" of the right/left eye image data of the previous frame period is the minimum gray level "0 (zero)", and a luminance change value L255, 255 obtained when both the gray level "i" of the left/right eye image data of the current frame period and the gray level "j" of the right/left eye image data of the previous frame period are the maximum gray level "255".

In another aspect, there is a method for driving the stereoscopic image display including the display panel, the method comprising previously storing modified values satisfying a luminance $L_i^*$ of a gray level "i" defined by the above Equation and modulating left eye image data or right eye image data input during a current frame period to a modified value selected based on the result of a comparison between right/left eye image data input during a previous frame period and the left/right eye image data of the current frame period using the previously stored modified values, converting the modulated left/right eye image data of the current frame period into an analog gamma compensation voltage to generate a data voltage and supplying the data voltage to the data lines, and supplying a gate pulse synchronized with the data voltage to the gate lines.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
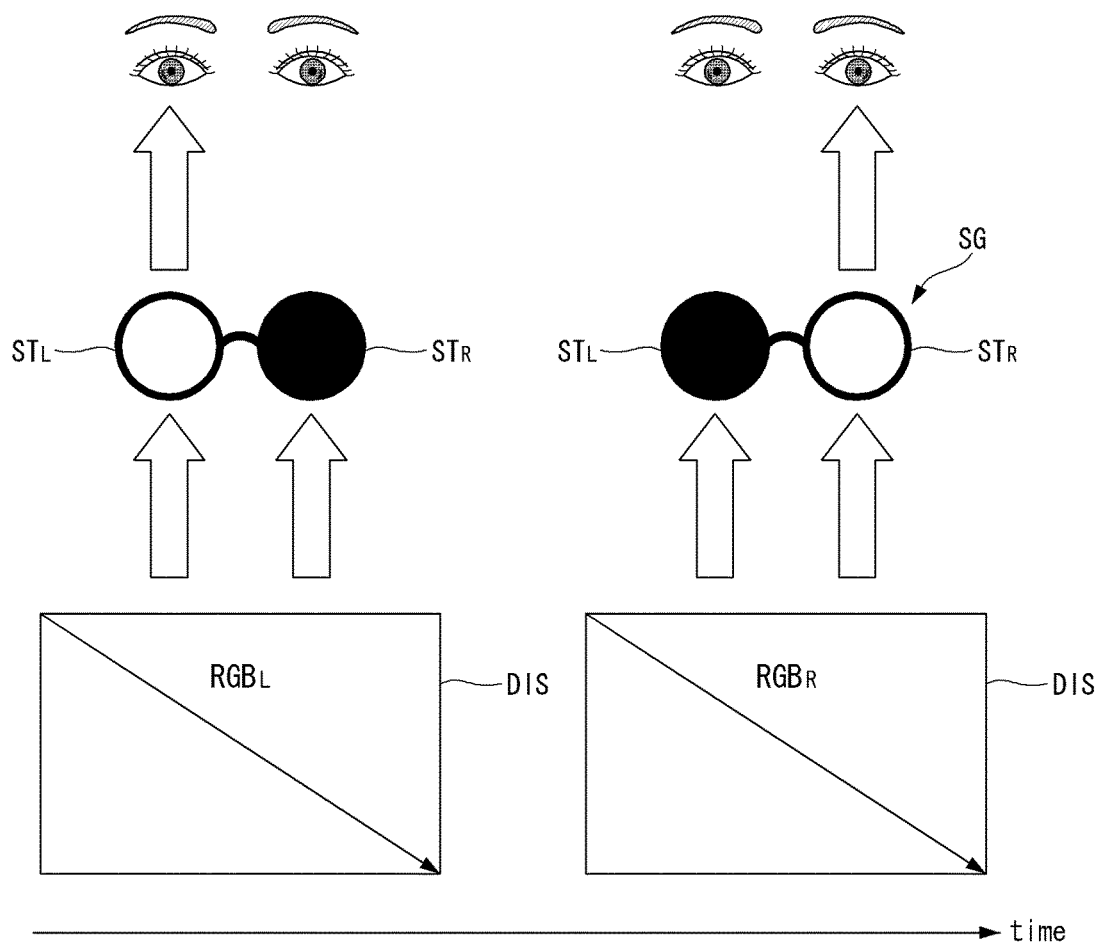
FIG. 1 illustrates the operation principle of a shutter glasses type stereoscopic image display according to an exemplary embodiment of the invention.

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

An exemplary embodiment of the invention may be applied to a glasses type stereoscopic image display in which a left eye image and a right eye image are input in a time division manner and light incident on user's eyes is separated through glasses.

FIG. 1 illustrates the operation principle of a shutter glasses type stereoscopic image display according to an exemplary embodiment of the invention.

As shown in FIG. 1, a black region of shutter glasses SG represents a shutter that blocks light traveling toward an observer (i.e., a viewer), and a white region of the shutter glasses SG represents a shutter allowing transmission of light toward the observer. When a liquid crystal display panel is selected as a display panel DIS, a backlight unit providing light to the display panel DIS is necessary.

In a three-dimensional (3D) mode, during odd-numbered frame periods, data $RGB_L$ of a left eye image is written to the display panel DIS, and a left eye shutter $ST_L$ of the shutter glasses SG is open. Further, during even-numbered frame periods, data $RGB_R$ of a right eye image is written to the display panel DIS, and a right eye shutter $ST_R$ of the shutter glasses SG is open. The left eye shutter $ST_L$ and the right eye shutter $ST_R$ of the shutter glasses SG are electrically controlled through a wire or wireless interface and are synchronized with the display panel DIS. Thus, the observer may view only the left eye image with his or her left eye during the odd-numbered frame periods and may view only the right eye image with his/her right eye during the even-numbered periods, thereby feeling a stereoscopic feeling through the stereoscopic technique.

Figure 2:
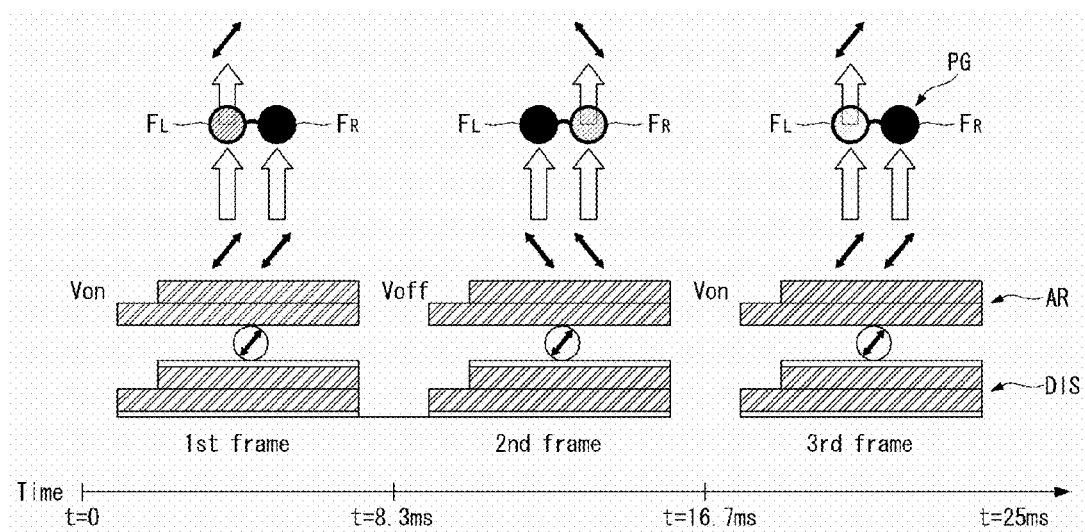
FIG. 2 illustrates the operation principle of a polarization glasses type stereoscopic image display according to an exemplary embodiment of the invention.

FIG. 2 illustrates the operation principle of a polarization glasses type stereoscopic image display according to an exemplary embodiment of the invention.

As shown in FIG. 2, in the 3D mode, data $RGB_L$ of the left eye image is written to the display panel DIS during the odd-numbered frame periods, and data $RGB_R$ of the right eye image is written to the display panel DIS during the even-numbered periods.

An active retarder AR is attached to the display panel DIS. The active retarder AR differently converts polarization characteristic of the left eye image and polarization characteristic of the right eye image.

Light of the left eye image and the right eye image, that are displayed on the display panel DIS in the time division manner, is converted into a predetermined polarized light (for example, a left-handed polarized light) through a polarizing plate of the display panel DIS and is incident on the active retarder AR. The active retarder AR is synchronized with the display panel DIS. When the left eye image is displayed on the display panel DIS, the active retarder AR does not convert polarization characteristic of light from the display panel DIS and then passes through the light from the display panel DIS. On the other hand, when the right eye image is displayed on the display panel DIS, the active retarder AR converts polarization characteristic of light from the display panel DIS into other polarization characteristic. For example, the active retarder AR converts light from the display panel DIS into right-handed polarized light and then passes through the right-handed polarized light. The active retarder AR includes a common electrode and a plurality of scan electrodes that are positioned opposite the common electrode with a liquid crystal layer interposed therebetween. The active retarder AR may be implemented as a liquid crystal panel of a twisted nematic (TN) mode in which a polarizing plate, a color filter, a black matrix, etc. are absent. When an ON voltage Von is applied to the scan electrodes of the active retarder AR, the active retarder AR may pass through incident light without the conversion. When an OFF voltage Voff is applied to the scan electrodes of the active retarder AR, the active retarder AR may retard a phase of the incident light by λ/2 to convert polarization characteristic of the incident light, where λ is a wavelength of light.

Polarization glasses PG include a left eye filter FL transmitting only left-handed polarized light and a right eye filter FR transmitting only right-handed polarized light. Thus, the observer may view only the left eye image with his/her left eye during the odd-numbered frame periods and may view only the right eye image with his/her right eye during the even-numbered periods, thereby feeling the stereoscopic feeling through the stereoscopic technique The display panel DIS displays a 2D image in a 2D mode and displays the 3D plane image in the 3D mode.

FIGS. 3 to 7 illustrate a generation cause of the 3D crosstalk and a distortion of gamma characteristic resulting from the 3D crosstalk.

FIGS. 3 to 5B illustrate a generation cause of the 3D crosstalk.

Figure 3:
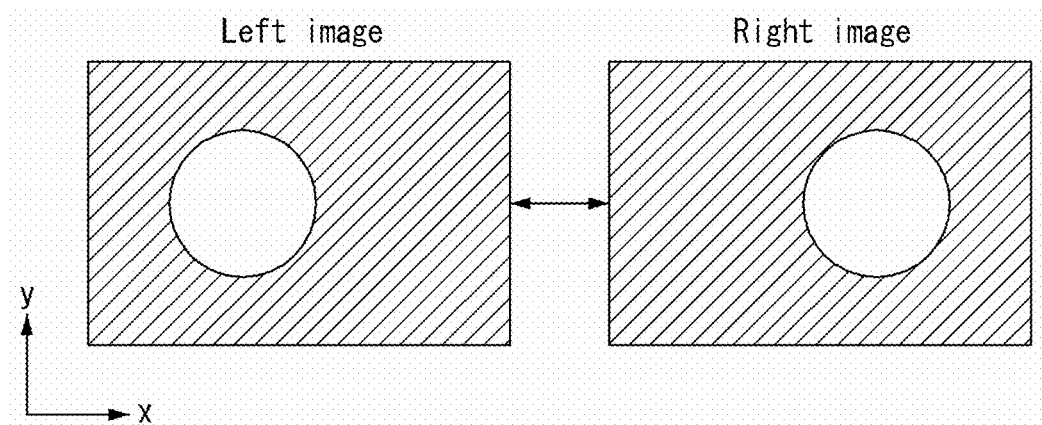
FIG. 3 illustrates test images of left and right eye images for generating a 3D crosstalk.
Figure 4:
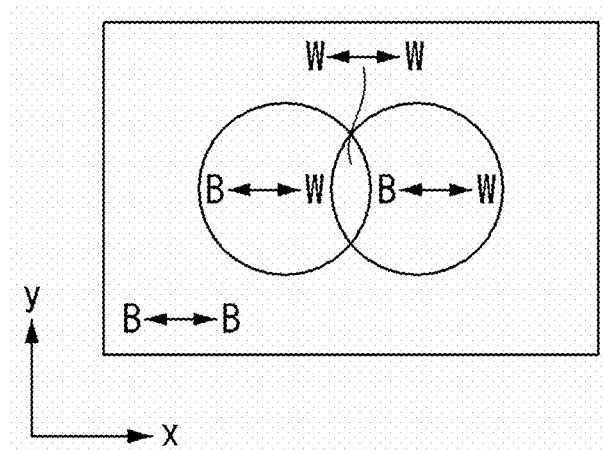
FIG. 4 illustrates changes in a gray level of an image reproduced on a display panel when the left and right eye images illustrated in FIG. 3 are alternately displayed on the display panel in a time division manner.

As shown in FIG. 3, a left eye image and a right eye image are alternately displayed on the display panel DIS so as to generate the 3D crosstalk. Each of the left eye image and the right eye image is an image including a white circle on a black background. As shown in FIG. 4, the white circle of the left eye image and the white circle of the right eye image partially overlap each other. Data of the black background is data having a minimum gray level (or a black gray level), and data of the white circle is data having a maximum gray level (or a white gray level).

Figure 5A:
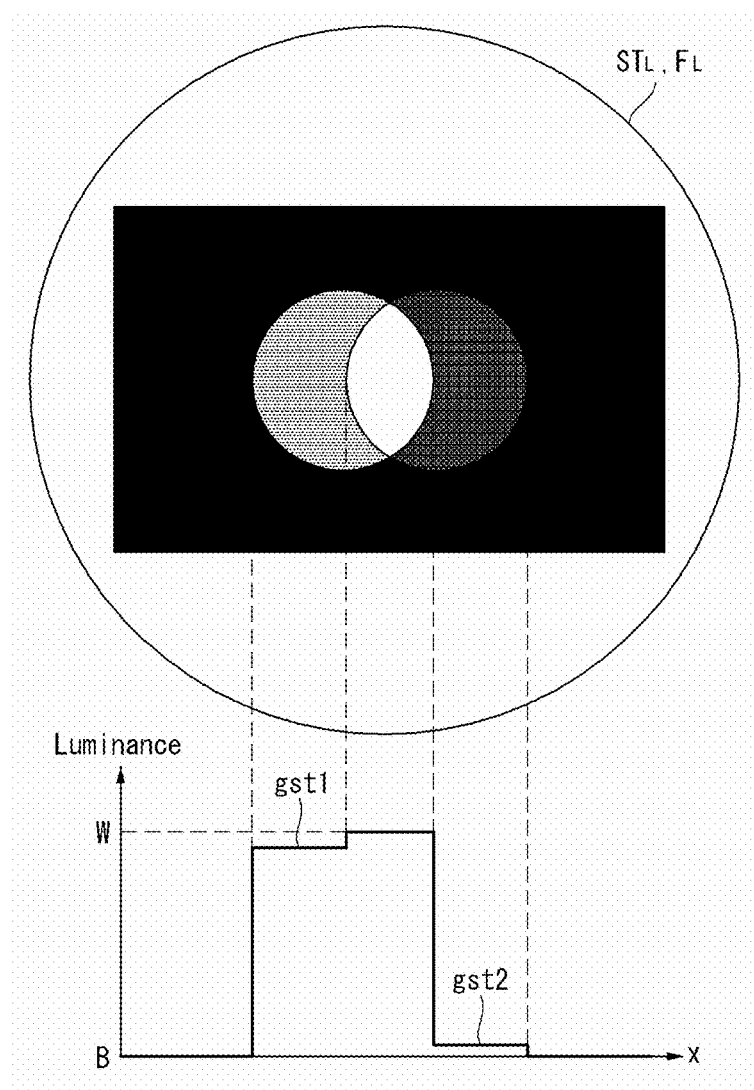
FIG. 5A illustrates changes in a gray level of a left eye image perceived through a user's left eye when the left and right eye images illustrated in FIG. 3 are alternately displayed on a display panel in a time division manner.
Figure 5B:
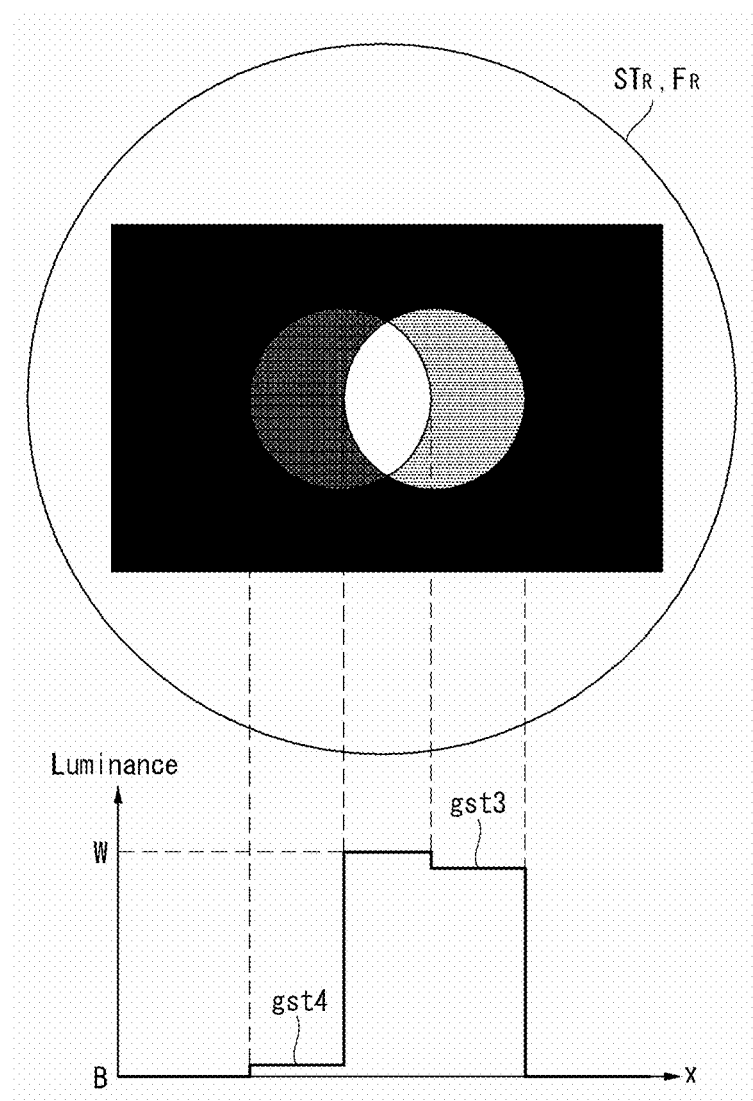
FIG. 5B illustrates changes in a gray level of a right eye image perceived through a user's right eye when the left and right eye images illustrated in FIG. 3 are alternately displayed on a display panel in a time division manner.

When the left eye image and the right eye image are alternately displayed on the display panel DIS as shown in FIG. 3, gray levels of the black background data, the white circle data, etc. vary as shown in FIG. 4. More specifically, the black backgrounds of the left and right eye images are displayed at the black gray level B without changes in the gray level, and an overlap portion between the white circles of the left and right eye images is displayed at the white gray level W without changes in the gray level. On the other hand, the white circle of the left eye image except the white overlap portion changes from the black gray level B of the right eye image to the white gray level W of the right eye image. The white circle of the right eye image except the white overlap portion changes from the black gray level B of the left eye image to the white gray level W of the left eye image. Thus, the user wearing the shutter glasses SG or the polarization glasses PG views the left eye image at a luminance shown in FIG. 5A with his/her left eye and views the right eye image at a luminance shown in FIG. 5B with his/her right eye. As a result, as shown in FIGS. 5A and 5B, a ghosting phenomenon appears in the left and right eye images the user views because of an influence of a previous gray level. In FIGS. 5A and 5B, gst1 and gst3 represent a gray level lower than the white gray level W corresponding to an original gray level because of an influence of the previous black gray level B. Further, gst2 and gst4 represent a gray level higher than the black gray level B corresponding to an original gray level because of an influence of the previous white gray level W.

Figure 6:
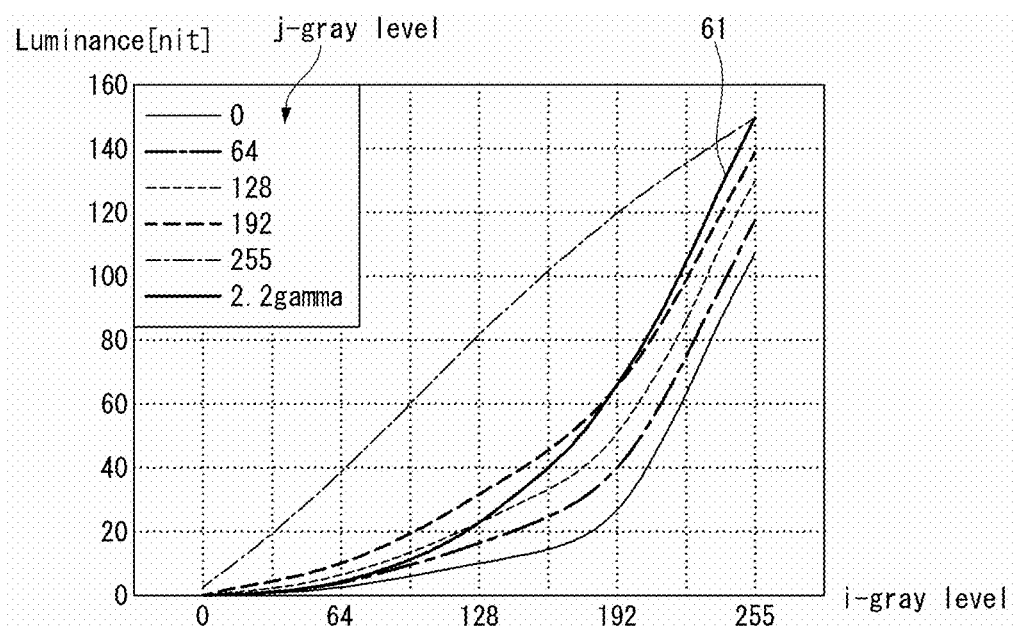
FIG. 6 is a graph illustrating the result of an experimental example where gamma characteristic is distorted because of an influence of a previous gray level.

FIG. 6 is a graph illustrating the result of an experimental example where gamma characteristic is distorted because of an influence of a previous gray level.

In FIG. 6, j-gray level and i-gray level are gray levels of a left eye image and a right eye image successively displayed on the same pixel of the display panel DIS, where i and j are a positive integer. More specifically, the i-gray level is a gray level of one of the left eye image and the right eye image displayed during a current frame period. The j-gray level is a gray level of one of the left eye image and the right eye image displayed during a previous frame period and affects the i-gray level. As shown in FIG. 6, when the left eye image or the right eye image is displayed at the i-gray level during the current frame period, the left/right eye image of the i-gray level does not meet an optimum gamma curve 61 because of an influence of the j-gray level of the left/right eye image that has been displayed during the previous frame period. Hence, gamma characteristic of the left/right eye image of the i-gray level is distorted. In particular, when the j-gray level is the white gray level "255", the gamma characteristic of the left/right eye image of the i-gray level is greatly distorted.

Figure 7:
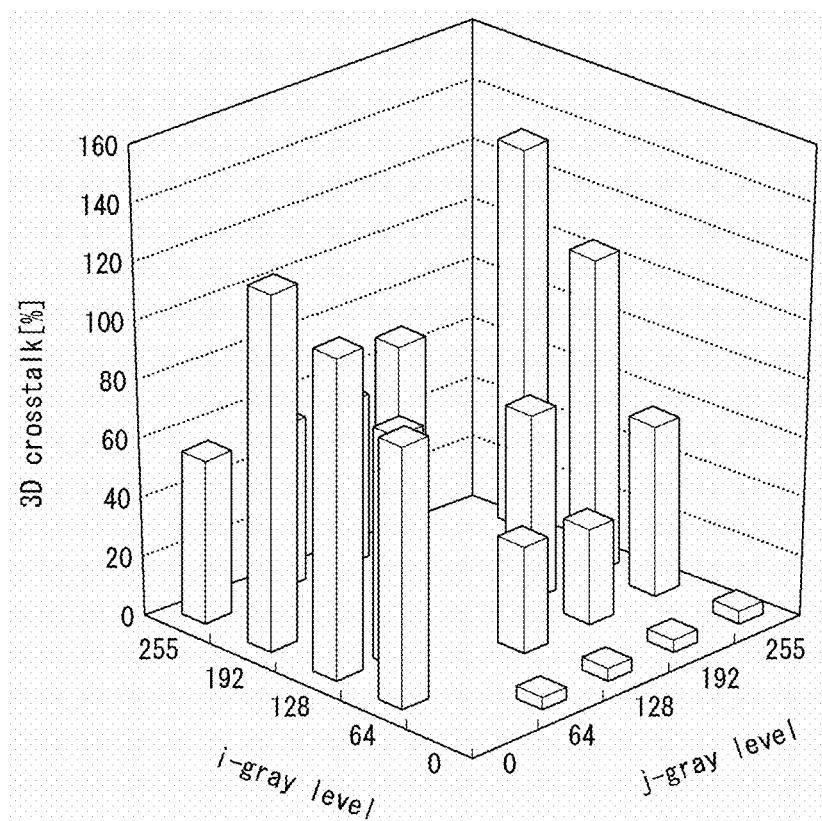
FIG. 7 is a graph quantifying a 3D crosstalk in which an original gray level is distorted because of an influence of a previous gray level.

The present inventors of the invention quantified a 3D crosstalk $CT_{i,j}$ (unit: %) based on gray level-to-gray level changes illustrated in FIG. 6 using the following Equation (1). FIG. 7 is a graph illustrating the result of the quantification of the 3D crosstalk illustrated in FIG. 6.

$$CT_{i,j}[\%] = \left| \frac{G_{i,j} - G_{i,i}}{G_{j,i} - G_{i,i}} \right| \times 100 \qquad (1)$$

where $G_{i,j}$ is a change amount of the i-gray level affected by the j-gray level, $G_{j,i}$ is a change amount of the j-gray level affected by the i-gray level, and $G_{i,i}$ is a change amount of the i-gray level when the j-gray level is equal to the i-gray level.

Figure 8A:
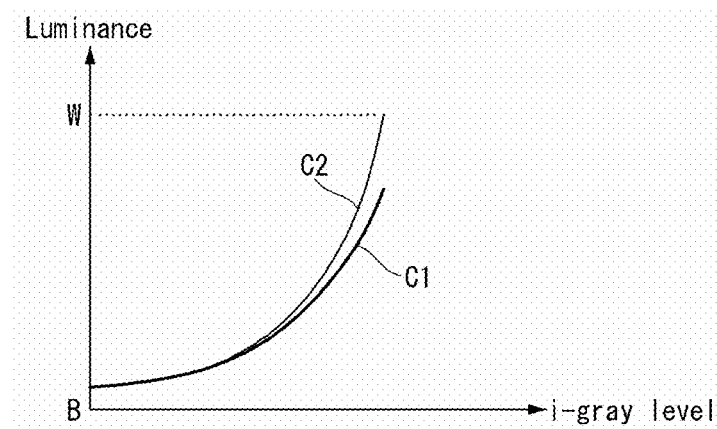
FIGS. 8A and 8B are graphs illustrating gamma curves according to an exemplary embodiment of the invention.
Figure 8B:
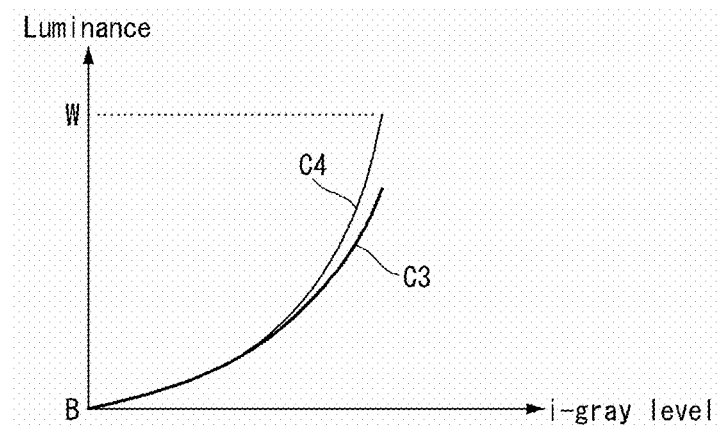

The embodiment of the invention modifies gray levels of input data of each of the left and right eye images in conformity with one of first to fourth gamma curves C1 to C4 shown in FIGS. 8A and 8B, so that gamma characteristic of each of the left and right eye images meets one of the first to fourth gamma curves C1 to C4.

FIGS. 8A and 8B are graphs illustrating the first to fourth gamma curves C1 to C4 according to the exemplary embodiment of the invention.

In FIGS. 8A and 8B, a transverse axis is the i-gray level, and a longitudinal axis is a luminance of each gray level.

The first to fourth gamma curves C1 to C4 may be expressed by the following Equation (2).

$$L_i^* = X + \left( \frac{i}{255} \right)^\gamma \cdot (Y - X) \qquad (2)$$

where $L_i^*$ is a luminance of current frame data of the i-gray level to be represented, and γ may vary depending on the characteristic of the display panel but may be set to a value between 2 and 3. Further, γ may be set to 2.2 in most of the display panels to which 2.2 gamma correction is applied.

Further, in the above equation (2), X and Y are defined depending on the first to fourth gamma curves C1 to C4.

In the first gamma curve C1, X is a luminance change value $L_{0,255}$ when the i-gray level is zero and the j-gray level is 255, and Y is a luminance change value $L_{255,0}$ when the i-gray level is 255 and the j-gray level is zero. Thus, the first gamma curve C1 is expressed by the following Equation (3). In the first gamma curve C1, when the i-gray level to be represented in the current frame period is the minimum gray level (or the black gray level), the i-gray level is represented on the display panel DIS at a luminance greater than a minimum luminance of the display panel DIS. Further, when the i-gray level to be represented in the current frame period is the maximum gray level (or the white gray level), the i-gray level is represented on the display panel DIS at a luminance less than a maximum luminance of the display panel DIS. The luminance greater than the minimum luminance of the display panel DIS is determined by an increasing amount of the minimum i-gray level represented in the current frame period because of the influence of the maximum j-gray level "255" when the j-gray level of the previous frame period is the maximum gray level "255", and also is determined depending on the characteristic of the display panel DIS. The luminance less than the maximum luminance of the display panel DIS is determined by a decreasing amount of the maximum i-gray level represented in the current frame period because of the influence of minimum j-gray level "0" when the j-gray level of the previous frame period is the minimum gray level "0", and also is determined depending on the characteristic of the display panel DIS.

$$L_i^* = L_{0,255} + \left(\frac{i}{255}\right)^\gamma \cdot (L_{255,0} - L_{0,255}) \qquad (3)$$

In the second gamma curve C2, X is a luminance change value $L_{0,255}$ when the i-gray level is zero and the j-gray level is 255, and Y is a luminance change value $L_{255,255}$ when both the i-gray level and the j-gray level are 255. Thus, the second gamma curve C2 is expressed by the following Equation (4). In the second gamma curve C2, when the i-gray level to be represented in the current frame period is the minimum gray level (or the black gray level), the i-gray level is represented on the display panel DIS at a luminance greater than a minimum luminance of the display panel DIS. Further, when the i-gray level to be represented in the current frame period is the maximum gray level (or the white gray level), the i-gray level is represented on the display panel DIS at a maximum luminance of the display panel DIS. The luminance greater than the minimum luminance of the display panel DIS is determined by an increasing amount of the minimum i-gray level represented in the current frame period because of the influence of the maximum j-gray level "255" when the j-gray level of the previous frame period is the maximum gray level "255", and also is determined depending on the characteristic of the display panel DIS.

$$L_i^* = L_{0,255} + \left(\frac{i}{255}\right)^\gamma \cdot (L_{255,255} - L_{0,255}) \qquad (4)$$

In the third gamma curve C3, X is a luminance change value $L_{0,0}$ when both the i-gray level and the j-gray level are zero, and Y is a luminance change value $L_{255,0}$ when the i-gray level is 255 and the j-gray level is zero. Thus, the third gamma curve C3 is expressed by the following Equation (5). In the third gamma curve C3, when the i-gray level to be represented in the current frame period is the minimum gray level (or the black gray level), the i-gray level is represented on the display panel DIS at a minimum luminance of the display panel DIS. Further, when the i-gray level to be represented in the current frame period is the maximum gray level (or the white gray level), the i-gray level is represented on the display panel DIS at a luminance less than a maximum luminance of the display panel DIS. The luminance less than the maximum luminance of the display panel DIS is determined by a decreasing amount of the maximum i-gray level represented in the current frame period because of the influence of minimum j-gray level "0" when the j-gray level of the previous frame period is the minimum gray level "0", and also is determined depending on the characteristic of the display panel DIS.

$$L_i^* = L_{0,0} + \left(\frac{i}{255}\right)^\gamma \cdot (L_{255,0} - L_{0,0}) \qquad (5)$$

In the fourth gamma curve C4, X is a luminance change value $L_{0,0}$ when both the i-gray level and the j-gray level are zero, and Y is a luminance change value $L_{255,255}$ when both the i-gray level and the j-gray level are 255. Thus, the fourth gamma curve C4 is expressed by the following Equation (6). In the fourth gamma curve C4, when the i-gray level to be represented in the current frame period is the minimum gray level (or the black gray level), the i-gray level is represented on the display panel DIS at a minimum luminance of the display panel DIS. Further, when the i-gray level to be represented in the current frame period is the maximum gray level (or the white gray level), the i-gray level is represented on the display panel DIS at a maximum luminance of the display panel DIS.

$$L_i^* = L_{0,0} + \left(\frac{i}{255}\right)^\gamma \cdot (L_{255,255} - L_{0,0}) \qquad (6)$$

The first to fourth gamma curves C1 to C4 are implemented through a method for modulating the data of the left and right eye images to modulated values previously set to a lookup table that is described later.

Figure 9:
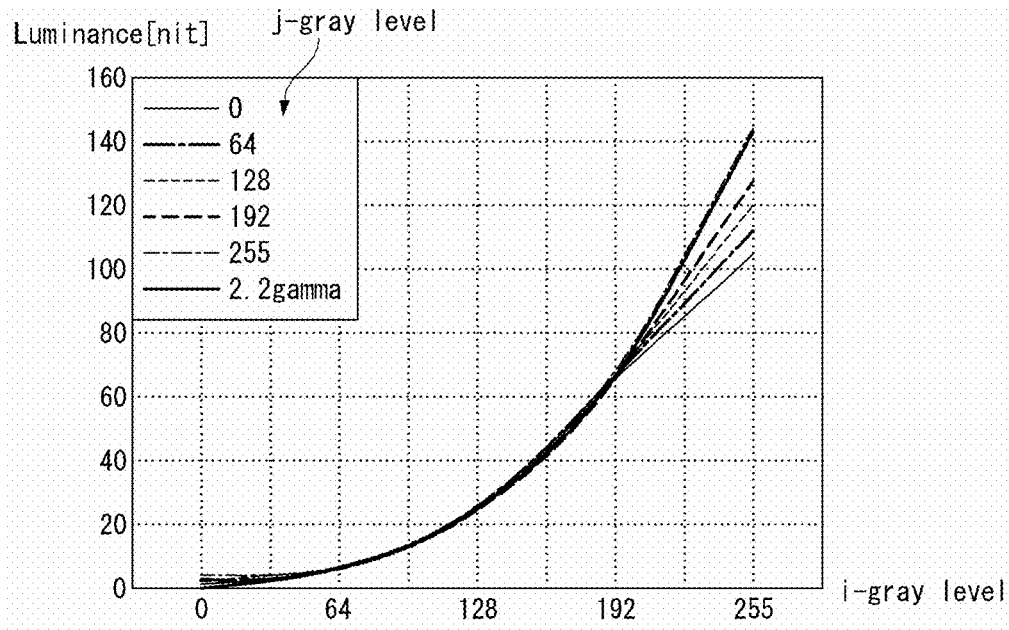
FIG. 9 is a graph illustrating the result of an experiment in which input data is modified to obtain a fourth gamma curve illustrated in FIG. 8B.
Figure 10:
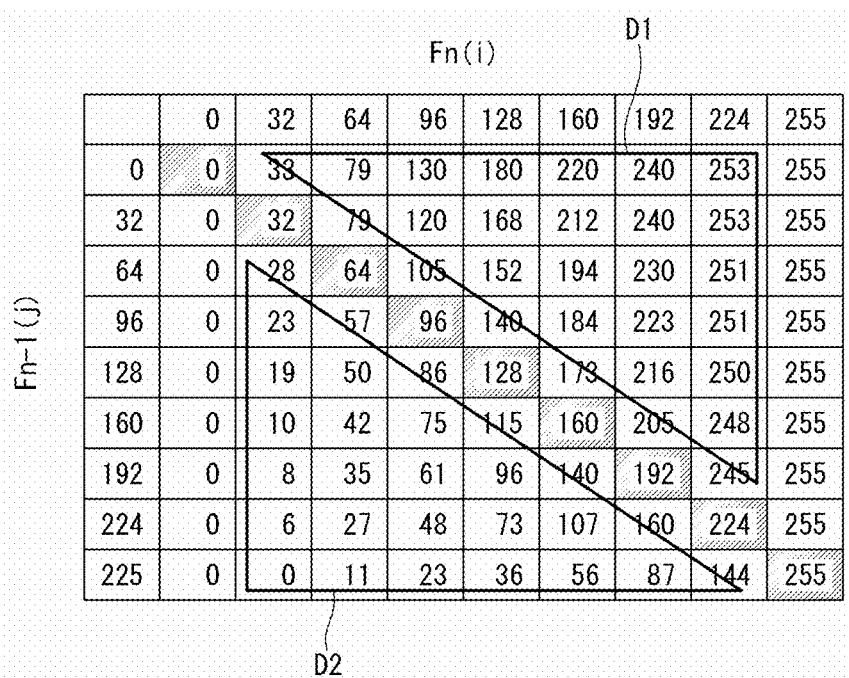
FIG. 10 illustrates modified values of a lookup table used in the experiment result of FIG. 9.

FIG. 9 is a graph illustrating the result of an experiment in which input data is modified to obtain the fourth gamma curve C4 illustrated in FIG. 8B. FIG. 10 illustrates modified values of a lookup table used in the experiment result of FIG. 9. In FIG. 10, a longitudinal axis is the j-gray level of data input during the previous frame period, and a transverse axis is the i-gray level of data input during the current frame period.

As shown in FIGS. 9 and 10, the embodiment of the invention modulates data of the left eye image or data of the right eye image using an over-driving modulation part D1 and a under-driving modulation part D2 of the lookup table shown in FIG. 10, thereby obtaining the fourth gamma curve C4.

The luminance of the display panel DIS is proportional to a light transmittance of the display panel DIS in a display device such as a liquid crystal display, and the light transmittance of the display panel DIS may be adjusted depending on the data voltage applied to the pixels of the display panel DIS. Further, the luminance of the display panel DIS is proportional to a light emitting amount of the display panel DIS in a self-emitting display device such as a plasma display panel (PDP) and an organic light emitting diode (OLED) display. The light emitting amount of the display panel DIS may be adjusted depending on the data voltage applied to the pixels of the display panel DIS. The data voltage may be adjusted depending on a gray level of the digital video data. Thus, the embodiment of the invention enters the modulation values meeting the first to fourth gamma curves C1 to C4 in the lookup table and modulates the digital video data to the modulation values, thereby adjusting the luminance of the 3D image. Hence, the 3D crosstalk is prevented.

As indicated by the following Equation (7), when a gray level Fn(i) of pixel data of one of the left and right eye images input during a current frame period Fn is greater than a gray level Fn−1(j) of pixel data of one of the left and right eye images input during a previous frame period Fn−1, the over-driving modulation part D1 of the lookup table modulates gray levels of current frame data to modulated values Fn(i*) that are set to be greater than the original gray levels Fn(i) input during the current frame period Fn. As indicated by the following Equation (8), when the gray level Fn(i) of the pixel data of one of the left and right eye images input during the current frame period Fn is less than the gray level Fn−1(j) of the pixel data of one of the left and right eye images input during the previous frame period Fn−1, the under-driving modulation part D2 of the lookup table modulates gray levels of current frame data to modulated values Fn(i*) that are set to be less than the original gray levels Fn(i) input during the current frame period Fn. In the lookup table, a diagonal portion between the over-driving modulation part D1 and the under-driving modulation part D2 outputs the gray level Fn(i) of the current frame period Fn without the modulation when the gray level Fn(i) of the current frame period Fn is substantially equal to the gray level Fn−1(j) of the previous frame period Fn−1.

$$Fn(i) > Fn-1(j) \rightarrow Fn(i^*) > Fn(i) \quad (7)$$

$$Fn(i) < Fn-1(j) \rightarrow Fn(i^*) < Fn(i) \quad (8)$$

As can be seen from the comparison between FIGS. 6 and 9, when the gray levels of the pixel data of the left and right eye images are modulated so as to satisfy the fourth gamma curve C4, the gamma characteristic is scarcely affected by the j-gray level and does not change except a portion of the low gray levels and the high gray levels of the fourth gamma curve C4.

Figures 11, 12:
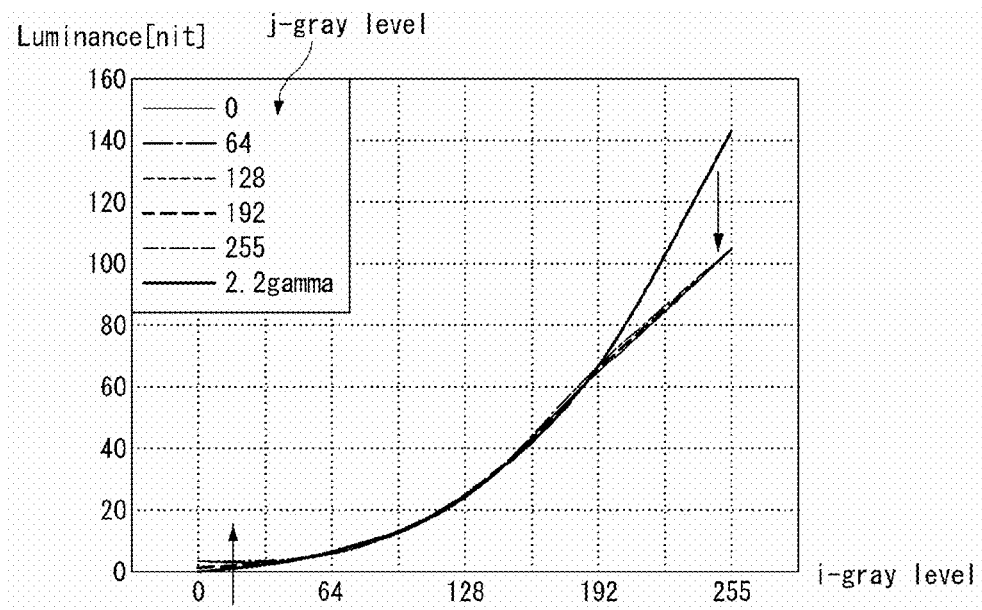
FIG. 11 is a graph illustrating the result of an experiment in which input data is modified to obtain a first gamma curve illustrated in FIG. 8A.
FIG. 12 illustrates modified values of a lookup table used in the experiment result of FIG. 11.

FIG. 11 is a graph illustrating the result of an experiment in which input data is modified to obtain the first gamma curve C1 illustrated in FIG. 8A. FIG. 12 illustrates modified values of a lookup table used in the experiment result of FIG. 11. In FIG. 11, a longitudinal axis is the j-gray level of data input during the previous frame period, and a transverse axis is the i-gray level of data input during the current frame period.

As shown in FIGS. 11 and 12, the embodiment of the invention modulates data of the left eye image or the right eye image using an over-driving modulation part D1, a under-driving modulation part D2, and a same gray level modulation part D3 of the lookup table shown in FIG. 12 to obtain the first gamma curve C1.

As indicated by the above Equation (7), when a gray level Fn(i) of pixel data of one of the left and right eye images input during a current frame period Fn is greater than a gray level Fn−1(j) of pixel data of one of the left and right eye images input during a previous frame period Fn−1, the over-driving modulation part D1 of the lookup table modulates gray levels of current frame data to modulated values Fn(i*) that are set to be greater than the original gray levels Fn(i) input during the current frame period Fn. As indicated by the above Equation (8), when the gray level Fn(i) of the pixel data of one of the left and right eye images input during the current frame period Fn is less than the gray level Fn−1(j) of the pixel data of one of the left and right eye images input during the previous frame period Fn−1, the under-driving modulation part D2 of the lookup table modulates gray levels of current frame data to modulated values Fn(i*) that are set to be less than the original gray levels Fn(i) input during the current frame period Fn. The same gray level modulation part D3 of the lookup table corresponds to a diagonal portion between the over-driving modulation part D1 and the under-driving modulation part D2. When the gray level Fn(i) of the pixel data of one of the left and right eye images input during the current frame period Fn is substantially equal to the gray level Fn−1(j) of the pixel data of one of the left and right eye images input during the previous frame period Fn−1, the same gray level modulation part D3 increases the i-gray level when the i-gray level is the minimum gray level. Further, the same gray level modulation part D3 reduces the i-gray level when the i-gray level is a gray level greater than the minimum gray level. In other words, the same gray level modulation part D3 modulates the maximum gray level of the first gamma curve C1 to a gray level of a luminance less than the maximum luminance of the display panel DIS and modulates the minimum gray level of the first gamma curve C1 to a gray level of a luminance greater than the minimum luminance of the display panel DIS.

As can be seen from the comparison between FIGS. 6 and 11, when the gray levels of the pixel data of the left and right eye images are modulated so as to satisfy the first gamma curve C1, the gamma characteristic does not change under any circumstances of the j-gray level of the previous frame period. When there is no difference between the gray levels of the data of the previous frame period and the current frame period, a gray level "200" of the maximum luminance of the first gamma curve C1 is less than a gray level "255" of a maximum luminance of the existing 2.2 gamma curve. Further, a gray level "5" of the minimum luminance of the first gamma curve C1 is greater than a gray level "0" of a minimum luminance of the existing 2.2 gamma curve.

Figure 13A:
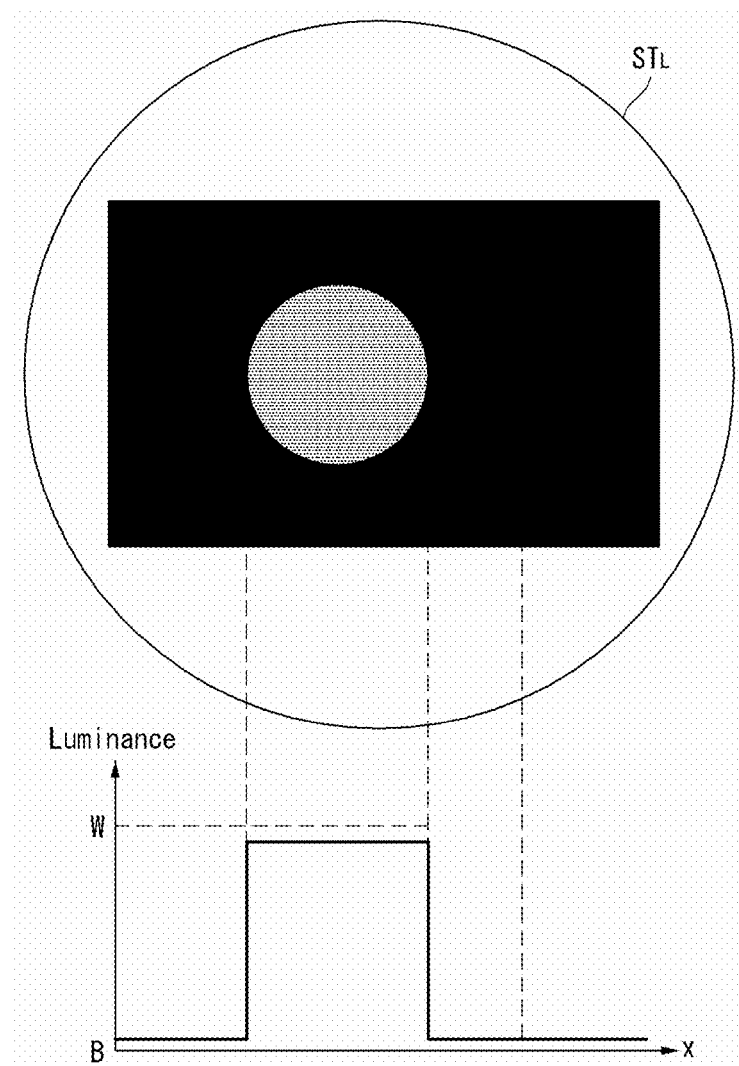
FIG. 13A illustrates an example where a ghosting phenomenon disappears in a left eye image when the test images illustrated in FIG. 3 are modified using the first gamma curve illustrated in FIG. 8A.
Figure 13B:
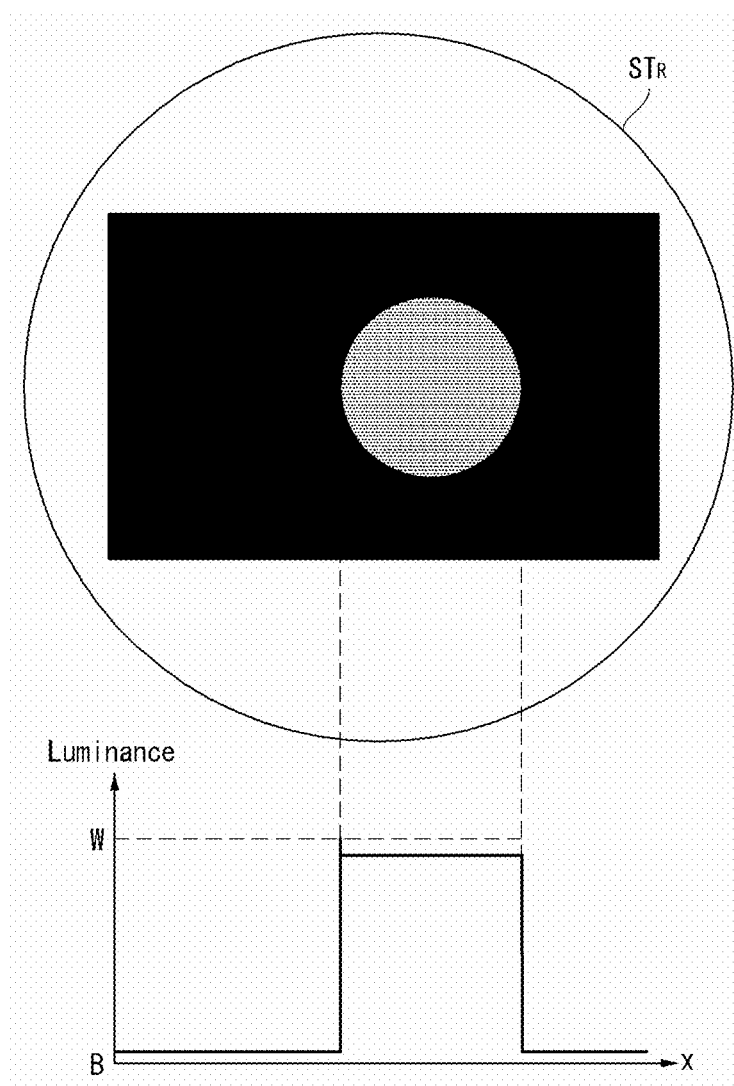
FIG. 13B illustrates an example where a ghosting phenomenon disappears in a right eye image when the test images illustrated in FIG. 3 are modified using the first gamma curve illustrated in FIG. 8A.

FIG. 13A illustrates an example where a ghosting phenomenon disappears in the left eye image when the test images illustrated in FIG. 3 are modified using the first gamma curve C1 illustrated in FIG. 8A. FIG. 13B illustrates an example where a ghosting phenomenon disappears in the right eye image when the test images illustrated in FIG. 3 are modified using the first gamma curve C1 illustrated in FIG. 8A.

Figure 14:
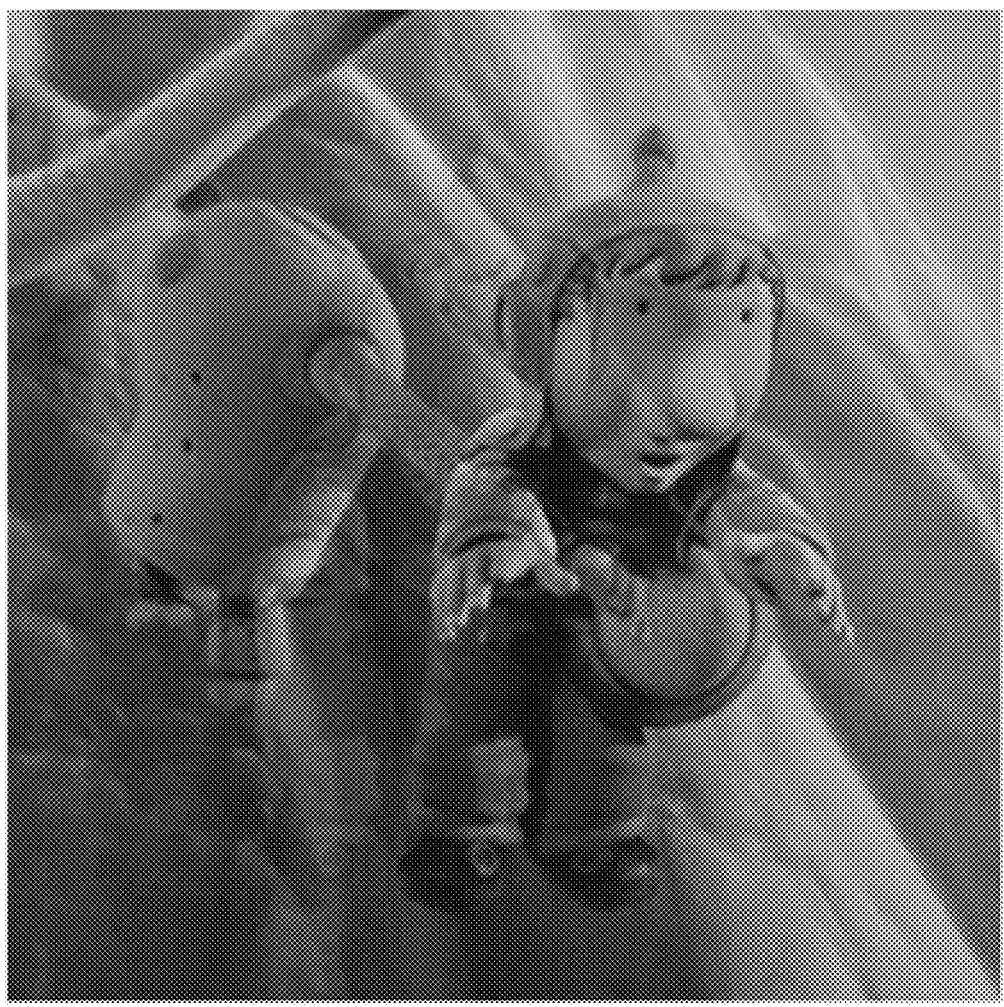
FIG. 14 illustrates the result of an experiment where a ghosting phenomenon appears in a 3D motion picture when data of a test image of the 3D motion picture is modified along an existing gamma curve illustrated in FIG. 6.
Figure 15:
FIG. 15 illustrates the result of an experiment where a ghosting phenomenon appears in a 3D motion picture when data of a test image of the 3D motion picture is modified along a first gamma curve illustrated in FIG. 11.

The embodiment of the invention modulates the data gray levels of the left and right eye images of the test images illustrated in FIG. 3 using the first gamma curve C1. In this instance, as can be seen from the comparison between FIGS. 5a and 13a, because the luminance of the maximum gray level decreases, a first ghosting phenomenon gst1 is removed in the left eye image the user views. Further, because the luminance of the minimum gray level increases, a second ghosting phenomenon gst2 is removed in the left eye image the user views. In the same manner as FIGS. 5a and 13a, as can be seen from the comparison between FIGS. 5b and 13b, because the luminance of the maximum gray level decreases, a third ghosting phenomenon gst3 is removed in the left eye image the user views. Further, because the luminance of the minimum gray level increases, a fourth ghosting phenomenon gst4 is removed in the left eye image the user views. This result was proved from the experiment result illustrated in FIGS. 14 and 15. FIG. 14 illustrates the result of an experiment where the ghosting phenomenon appears in a 3D motion picture when data of a test image of the 3D motion picture is modified along the existing gamma curve illustrated in FIG. 6. FIG. 15 illustrates the result of an experiment where the ghosting phenomenon appears in the 3D motion picture when the data of the test image of the 3D motion picture is modified along the first gamma curve C1 illustrated in FIG. 11.

Figure 16:
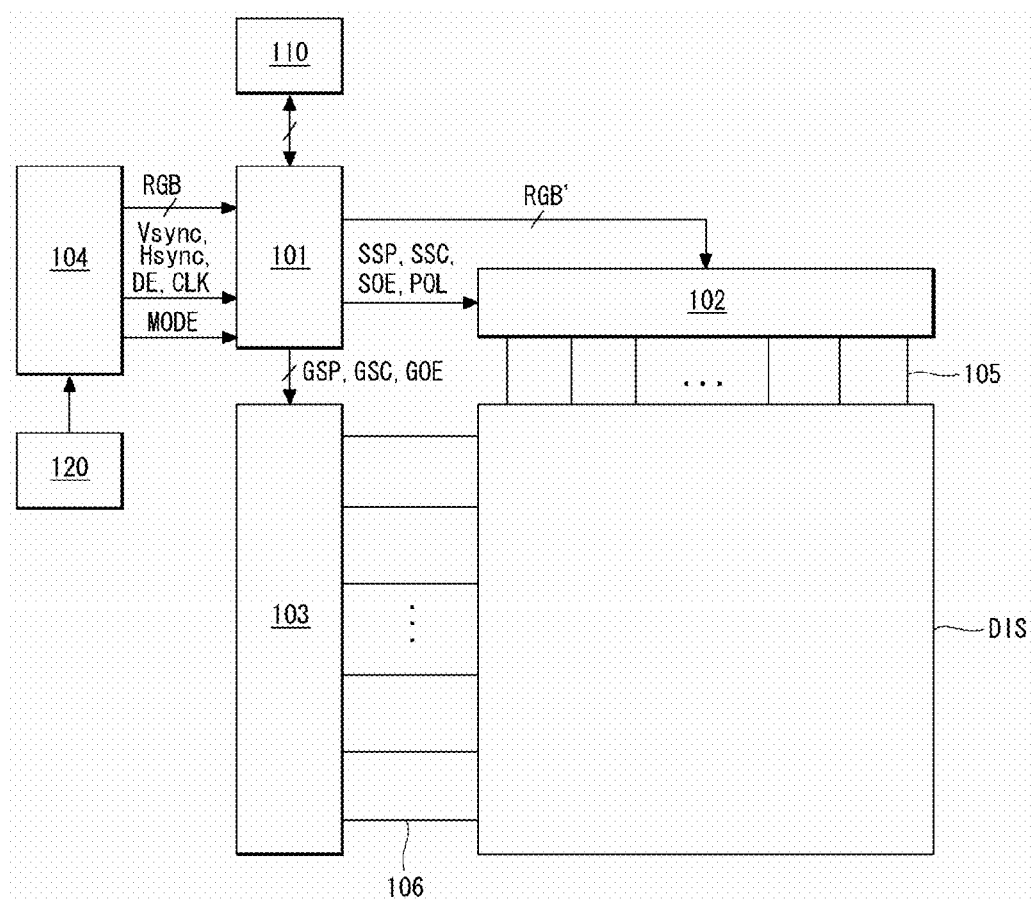
FIG. 16 is a block diagram of a stereoscopic image display according to an exemplary embodiment of the invention.
Figure 17:
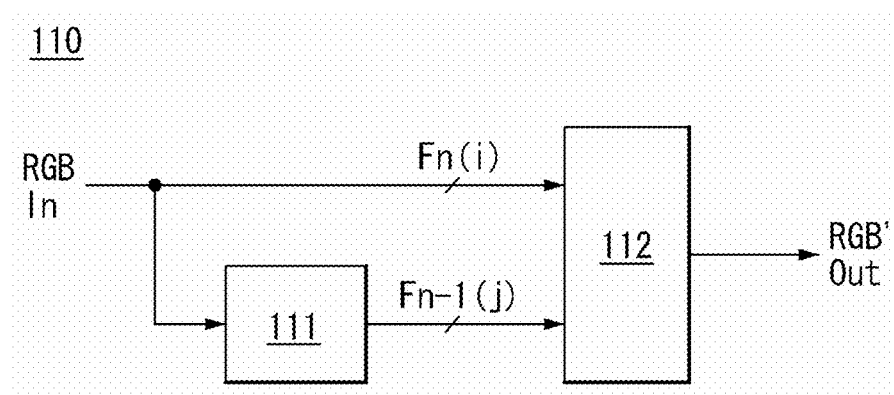
FIG. 17 is a block diagram illustrating in detail a data modulation unit shown in FIG. 16.

FIG. 16 is a block diagram of a stereoscopic image display according to the exemplary embodiment of the invention. FIG. 17 is a block diagram illustrating in detail a data modulation unit shown in FIG. 16. In FIG. 16, shutter glasses, an interface circuit, polarization glasses are omitted.

As shown in FIGS. 16 and 17, the stereoscopic image display according to the exemplary embodiment of the invention includes the display panel DIS, a timing controller 101, a data modulation unit 110, a data driving circuit 102, a gate driving circuit 103, and a system board 104.

The display panel DIS displays the 2D image and the 3D image. The display panel DIS may be implemented by a display element of any one of a liquid crystal display (LCD), a field emission display (FED), a plasma display panel (PDP), an electroluminescence device (EL) including an inorganic electroluminescence device and an organic light emitting diode (OLED), and an electrophoretic display (EPD). Other display elements may be used. When the display panel DIS is implemented by a display panel of the liquid crystal display, a backlight unit is necessary. The backlight unit may be implemented by one of an edge type backlight unit and a direct type backlight unit. Hereinafter, the display panel DIS is described using the display panel of the liquid crystal display as an example of the display panel DIS.

The display panel DIS includes a liquid crystal layer between two glass substrates. The display panel DIS includes liquid crystal cells arranged at crossings between data lines 105 and gate lines 106 (or scan lines) in a matrix form.

The timing controller 101 may switch between operations of the 2D mode and the 3D mode based on a mode signal MODE received from the system board 104 or a mode identification code coded to an input image signal. The timing controller 101 transfers the digital video data RGB of the 2D image and the 3D image received from the system board 104 to the data modulation unit 110. The timing controller 101 transfers modulated digital video data RGB' modulated by the data modulation unit 110 to the data driving circuit 102.

The timing controller 101 receives a timing signal, such as a vertical sync signal Vsync, a horizontal sync signal Hsync, a data enable DE, and a dot clock CLK, from the system board 104. The timing controller 101 then generates control signals for controlling an operation timing of each of the data driving circuit 102 and the gate driving circuit 103. The control signals include a gate timing control signal for controlling the operation timing of the gate driving circuit 103 and a data timing control signal for controlling the operation timing of the data driving circuit 102 and a polarity of the data voltage.

The timing controller 101 or the system board 104 may multiply an input frame frequency of 60 Hz by 'i' to thereby drive the display panel DIS at a frame frequency of (60×i) Hz, where "i" is a positive integer equal to or greater than 2. The input frame frequency is 50 Hz in a phase alternate line (PAL) manner and is 60 Hz in a national television standards committee (NTSC) manner. When the input frame frequency is multiplied by 4 and is 200 Hz in the PAL manner, one frame period is approximately 5 msec. When the input frame frequency is multiplied by 4 and is 240 Hz in the NTSC manner, one frame period is approximately 4.16 msec.

The gate timing control signal includes a gate start pulse GSP, a gate shift clock GSC, a gate output enable GOE, and the like. The gate start pulse GSP is applied to a gate driver integrated circuit (IC) to generate a first gate pulse and controls the gate driver IC so that the first gate pulse is generated by the gate driver IC. The gate shift clock GSC is commonly input to a plurality of gate driver ICs of the gate driving circuit 103 and also shifts the gate start pulse GSP. The gate output enable GOE controls outputs of the gate driver ICs.

The data timing control signal includes a source start pulse SSP, a source sampling clock SSC, a polarity control signal POL, a source output enable SOE, and the like. The source start pulse SSP controls a data sampling start time of the data driving circuit 102. The source sampling clock SSC controls a sampling time of data inside the data driving circuit 102 based on a rising or falling edge. The polarity control signal POL controls a polarity of the data voltage output from the data driving circuit 102. The source output enable SOE controls an output time of the data driving circuit 102. If the digital video data RGB to be input to the data driving circuit 102 is transferred based on a mini low voltage differential signaling (LVDS) interface standard, the source start pulse SSP and the source sampling clock SSC may be omitted.

The data modulation unit 110 modulates the digital video data of the 3D image to the modified values satisfying one of the first to fourth gamma curves C1 to C4, so as to reduce the crosstalk of the 3D image including the left eye image and the right eye image. The data modulation unit 110 includes a frame memory 111 and a lookup table 112. The frame memory 111 stores a previous frame data and delays the previous frame data during one frame period, thereby synchronizing the previous frame data with a current frame data. In the 3D mode, when the previous frame data is data of the left eye image, the current frame data is data of the right eye image. On the contrary, when the previous frame data is data of the right eye image, the current frame data is data of the left eye image. The lookup table 112 stores the modified values (for example, the modified values of the lookup table illustrated in FIG. 10 or FIG. 12) satisfying one of the first to fourth gamma curves C1 to C4. The lookup table 112 receives the current frame data and the previous frame data received from the frame memory 111 as an input address and outputs the modified values stored in the address. The lookup table 112 then outputs corrected data RGB'. Thus, the lookup table 112 corrects the current frame data using the modified values selected based on the result of comparison between the current frame data and the previous frame data. The data modulation unit 110 may be mounted inside the timing controller 101.

The data driving circuit 102 includes a plurality of source driver ICs. Each of the source driver ICs includes a shift register, a latch, a digital-to-analog converter (DAC), an output buffer, and the like. The data driving circuit 102 latches the digital video data RGB' under the control of the timing controller 101. The data driving circuit 102 converts the latched digital video data RGB' into the analog gamma compensation voltages and inverts the polarity of the data voltage in response to the polarity control signal POL.

The gate driving circuit 103 sequentially supplies a gate pulse synchronized with the data voltage to the gate lines 106 in response to the gate timing control signals.

The system board 104 supplies the 2D image data or the 3D image data and the timing signals Vsync, Hsync, DE and CLK to the timing controller 101 through an interface, such as a low voltage differential signaling (LVDS) interface and a transition minimized differential signaling (TMDS) interface. The system board 104 supplies the 2D image to the timing controller 101 in the 2D mode and supplies the 3D image including the left eye image and the right eye image to the timing controller 101 in the 3D mode. The system board 104 may transmit the 2D image data and the 3D image data at the frame frequency of (60×i) Hz.

A user may select the 2D mode or the 3D mode using a user input device 120. The user input device 120 includes a touch screen, an on-screen display (OSD), a keyboard, a mouse, a remote controller, etc. that are attached to or mounted inside the display panel DIS. The system board 104 may switch between an operation of the 2D mode and an operation of the 3D mode in response to user data input through the user input device 120. The system board 104 may switch between the operation of the 2D mode and the operation of the 3D mode through a 2D or 3D identification code encoded to input image data.

As described above, the embodiment of the invention modulates the data of the left eye image and the data of the right eye image in consideration of changes in the gray level of each of the left eye image and the right eye image, that are input in the time division manner, thereby reducing the 3D crosstalk generated in the transition of the gray level between the left eye image and the right eye image.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display comprising:
    a display panel including data lines and gate lines crossing each other, the display panel configured to display data of a two-dimensional (2D) image in a 2D mode and display data of a three-dimensional (3D) image in a 3D mode in a time division manner;
    a data modulation unit configured to previously store modified values satisfying a luminance $L_i^*$ of a gray level "i" defined by the following Equation and modulate left eye image data or right eye image data input during a current frame period to a modified value selected based on the result of a comparison between right/left eye image data input during a previous frame period and the left/right eye image data of the current frame period using the previously stored modified values;
    a data driving circuit configured to convert the left/right eye image data of the current frame period modulated by the data modulation unit into an analog gamma compensation voltage, generate a data voltage using the analog gamma compensation voltage, and supply the data voltage to the data lines; and
    a gate driving circuit configured to supply a gate pulse synchronized with the data voltage to the gate lines, $$L_i^* = X + \left(\frac{i}{255}\right)^\gamma \cdot (Y - X)$$

where X is one of a luminance change value $L_{0,255}$ obtained when the gray level "i" of the left/right eye image data of the current frame period is a minimum gray level "0 (zero)" and a gray level "j" of the right/left eye image data of the previous frame period is a maximum gray level "255", and a luminance change value $L_{0,0}$ obtained when both the gray level "i" of the left/right eye image data of the current frame period and the gray level "j" of the right/left eye image data of the previous frame period are the minimum gray level "0 (zero)",
    Y is one of a luminance change value $L_{255,0}$ obtained when the gray level "i" of the left/right eye image data of the current frame period is the maximum gray level "255" and the gray level "j" of the right/left eye image data of the previous frame period is the minimum gray level "0 (zero)", and a luminance change value $L_{255,255}$ obtained when both the gray level "i" of the left/right eye image data of the current frame period and the gray level "j" of the right/left eye image data of the previous frame period are the maximum gray level "255".

2. The stereoscopic image display of claim 1, wherein when the above Equation is $$L_i^* = L_{0,255} + \left(\frac{i}{255}\right)^\gamma \cdot (L_{255,0} - L_{0,255}),$$

the left/right eye image data of the current frame period is displayed on the display panel at a luminance greater than a minimum luminance of the display panel when the gray level "i" thereof is the minimum gray level "0 (zero)", and the left/right eye image data of the current frame period is displayed on the display panel at a luminance less than a maximum luminance of the display panel when the gray level "i" thereof is the maximum gray level "255".

3. The stereoscopic image display of claim 1, wherein when the above Equation is $$L_i^* = L_{0,255} + \left(\frac{i}{255}\right)^\gamma \cdot (L_{255,255} - L_{0,255}),$$

the left/right eye image data of the current frame period is displayed on the display panel at a luminance greater than a minimum luminance of the display panel when the gray level "i" thereof is the minimum gray level "0 (zero)", and the left/right eye image data of the current frame period is displayed on the display panel at a maximum luminance of the display panel when the gray level "i" thereof is the maximum gray level "255".

4. The stereoscopic image display of claim 1, wherein when the above Equation is $$L_i^* = L_{0,0} + \left(\frac{i}{255}\right)^\gamma \cdot (L_{255,0} - L_{0,0}),$$

the left/right eye image data of the current frame period is displayed on the display panel at a minimum luminance of the display panel when the gray level "i" thereof is the minimum gray level "0 (zero)", and the left/right eye image data of the current frame period is displayed on the display panel at a luminance less than a maximum luminance of the display panel when the gray level "i" thereof is the maximum gray level "255".

5. The stereoscopic image display of claim 1, wherein when the above Equation is $$L_i^* = L_{0,0} + \left(\frac{i}{255}\right)^\gamma \cdot (L_{255,255} - L_{0,0}),$$

the left/right eye image data of the current frame period is displayed on the display panel at a minimum luminance of the display panel when the gray level "i" thereof is the minimum gray level "0 (zero)", and the left/right eye image data of the current frame period is displayed on the display panel at a maximum luminance of the display panel when the gray level "i" thereof is the maximum gray level "255".

6. The stereoscopic image display of claim 1, wherein the data modulation unit includes a lookup table having an over-driving modulation part and a under-driving modulation part,
    wherein when the gray level "i" of the left/right eye image data of the current frame period is greater than the gray level "j" of the right/left eye image data of the previous frame period, the over-driving modulation part modulates the gray level "i" of the left/right eye image data of the current frame period to a first modified value, that is set to a value greater than the gray level "i" of the left/right eye image data of the current frame period, wherein when the gray level "i" of the left/right eye image data of the current frame period is less than the gray level "j" of the right/left eye image data of the previous frame period, the under-driving modulation part modulates the gray level "i" of the left/right eye image data of the current frame period to a second modified value, that is set to a value less than the gray level "i" of the left/right eye image data of the current frame period.

7. The stereoscopic image display of claim 2, wherein the data modulation unit includes a lookup table having an over-driving modulation part, a under-driving modulation part, and a same gray level modulation part, wherein when the gray level "i" of the left/right eye image data of the current frame period is greater than the gray level "j" of the right/left eye image data of the previous frame period, the over-driving modulation part modulates the gray level "i" of the left/right eye image data of the current frame period to a first modified value, that is set to a value greater than the gray level "i" of the left/right eye image data of the current frame period, wherein when the gray level "i" of the left/right eye image data of the current frame period is less than the gray level "j" of the right/left eye image data of the previous frame period, the under-driving modulation part modulates the gray level "i" of the left/right eye image data of the current frame period to a second modified value, that is set to a value less than the gray level "i" of the left/right eye image data of the current frame period, wherein when the gray level "i" of the left/right eye image data of the current frame period is substantially equal to the gray level "j" of the right/left eye image data of the previous frame period, the same gray level modulation part increases the gray level "i" of the left/right eye image data of the current frame period when the gray level "i" is the minimum gray level and reduces the gray level "i" of the left/right eye image data of the current frame period when the gray level "i" is a gray level greater than the minimum gray level.

8. A method for driving a stereoscopic image display including a display panel that includes data lines and gate lines crossing each other, displays data of a two-dimensional (2D) image in a 2D mode, and display data of a three-dimensional (3D) image in a 3D mode in a time division manner, the method comprising:

previously storing modified values satisfying a luminance $L_i^*$ of a gray level "i" defined by the following Equation and modulating left eye image data or right eye image data input during a current frame period to a modified value selected based on the result of a comparison between right/left eye image data input during a previous frame period and the left/right eye image data of the current frame period using the previously stored modified values;

converting the modulated left/right eye image data of the current frame period into an analog gamma compensation voltage to generate a data voltage and supplying the data voltage to the data lines; and supplying a gate pulse synchronized with the data voltage to the gate lines, $$L_i^* = X + \left(\frac{i}{255}\right)^\gamma \cdot (Y - X)$$

where X is one of a luminance change value $L_{0,255}$ obtained when the gray level "i" of the left/right eye image data of the current frame period is a minimum gray level "0 (zero)" and a gray level "j" of the right/left eye image data of the previous frame period is a maximum gray level "255", and a luminance change value $L_{0,0}$ obtained when both the gray level "i" of the left/right eye image data of the current frame period and the gray level "j" of the right/left eye image data of the previous frame period are the minimum gray level "0 (zero)", and Y is one of a luminance change value $L_{255,0}$ obtained when the gray level "i" of the left/right eye image data of the current frame period is the maximum gray level "255" and the gray level "j" of the right/left image data of the previous frame period is the minimum gray level "0 (zero)", and a luminance change value $L_{255,255}$ obtained when both the gray level "i" of the left/right eye image data of the current frame period and the gray level "j" of the right/left eye image data of the previous frame period are the maximum gray level "255".

9. The method of claim 8, wherein the modulating of the left/right eye image data of the current frame period includes modulating the gray level "i" of the left/right eye image data of the current frame period using a lookup table having an over-driving modulation part and a under-driving modulation part, wherein when the gray level "i" of the left/right eye image data of the current frame period is greater than the gray level "j" of the right/left eye image data of the previous frame period, the over-driving modulation part modulates the gray level "i" of the left/right eye image data of the current frame period to a first modified value, that is set to a value greater than the gray level "i" of the left/right eye image data of the current frame period, wherein when the gray level "i" of the left/right eye image data of the current frame period is less than the gray level "j" of the right/left eye image data of the previous frame period, the under-driving modulation part modulates the gray level "i" of the left/right eye image data of the current frame period to a second modified value, that is set to a value less than the gray level "i" of the left/right eye image data of the current frame period.

10. The method of claim 8, wherein the modulating of the left/right eye image data of the current frame period includes modulating the gray level "i" of the left/right eye image data of the current frame period using a lookup table having an over-driving modulation part, a under-driving modulation part, and a same gray level modulation part, wherein when the gray level "i" of the left/right eye image data of the current frame period is greater than the gray level "j" of the right/left eye image data of the previous frame period, the over-driving modulation part modulates the gray level "i" of the left/right eye image data of the current frame period to a first modified value, that is set to a value greater than the gray level "i" of the left/right eye image data of the current frame period, wherein when the gray level "i" of the left/right eye image data of the current frame period is less than the gray level "j" of the right/left eye image data of the previous frame period, the under-driving modulation part modulates the gray level "i" of the left/right eye image data of the current frame period to a second modified value, that is set to a value less than the gray level "i" of the left/right eye image data of the current frame period, wherein when the gray level "i" of the left/right eye image data of the current frame period is substantially equal to the gray level "j" of the right/left eye image data of the previous frame period, the same gray level modulation part increases the gray level "i" of the left/right eye image data of the current frame period when the gray level "i" is the minimum gray level and reduces the gray level "i" of the left/right eye image data of the current frame period when the gray level "i" is a gray level greater than the minimum gray level.

\* \* \* \* \*